United States Patent [19]

Daniele

[11] Patent Number: 4,728,984
[45] Date of Patent: Mar. 1, 1988

[54] DATA HANDLING AND ARCHIVING SYSTEM

[75] Inventor: Joseph J. Daniele, Pittsford, N.Y.

[73] Assignee: Xerox Corporation, Stamford, Conn.

[21] Appl. No.: 931,485

[22] Filed: Nov. 17, 1986

[51] Int. Cl.⁴ ............................................. G03G 15/00
[52] U.S. Cl. ............................................ 355/6; 355/8; 355/14 C
[58] Field of Search .............. 355/6, 7, 8, 14 R, 14 C, 355/133

[56] References Cited

U.S. PATENT DOCUMENTS

| | | | |
|---|---|---|---|
| 3,687,256 | 8/1972 | Jones | 197/1 R |
| 3,936,182 | 2/1976 | Sheikh | 355/14 |
| 3,986,449 | 10/1976 | Hamisch, Jr. et al. | 101/93.04 |
| 4,248,528 | 2/1981 | Sahay | 355/14 R |
| 4,609,283 | 9/1986 | Murata et al. | 355/14 R |
| 4,665,004 | 5/1987 | Drexler | 354/110 X |

OTHER PUBLICATIONS

Noyes, "Transparent Carrier for Entry of Job Control Information in Copier", IBM Discl. Bulletin, vol. 18, No. 9, Feb. 76, p. 2808.

Primary Examiner—Peter S. Wong
Attorney, Agent, or Firm—Frederick E. McMullen

[57] ABSTRACT

A system for enhancing the use of digitized documents as information transmitting and storage objects in connection with an electronic printer having an image input scanner for scanning documents and converting the image content to image signals. In one embodiment, a bar-coded document has an encoded image representing a secret message, and the printer is equipped with a recognition circuit that uses the bar code to distinguish the encoded document from other non-coded documents to be printed and readies a decoder which upon proper authentication, automatically decodes the encoded image signals output by the array so that the printer provides a print with the decoded message.

In a second embodiment, the digitized image comprises an auxiliary software program to be loaded into the printer memory, with a selector circuit for loading the software signals output by the array into the printer memory, with a selector circuit for loading the software signals output by the array into the printer memory.

13 Claims, 7 Drawing Figures

DATA HANDLING AND ARCHIVING SYSTEM

The invention relates to electronic printing machines and systems, and particularly to an improved electronic printing machine and system facilitating use of documents as a digital storage and programming medium.

The advent of the electronic age has presented new features and advantages as well as disadvantages in the creation, processing, and handling of image information. One particular advantage envisioned is the doing away or elimination of hard copies altogether. However, this aim is complicated by the difficulty and high cost of retaining and storing images electronically. While an image represented by electrical signals or pixels, as a minimum, requires some memory to at least temporarily store the signals while the image is being worked on, printed, etc., the memory size and cost necessary for this purpose is small when compared to the memory size and cost required to permanently store documents in the form of image signals.

Further electronic storage of documents is in fact not very permanent at all but at best limited to a period of a few years before deterioration and loss of image sets in. And, electronic memory is not tamper proof. Persons having access to the memory can alter the memory contents and hence change the content of the stored document. This possibility is of particular concern to the legal profession where exact and verifiable records are a must.

On the other hand, the common piece of paper, which has been used for years as a storage medium and which the electronic system intends to replace, has many desirable long term storage attributes. For example, with reasonable care, deterioration of a paper document takes place over decades. Attempted alteration of a paper document is detectable, and this is true even in the case where attempts are made to conceal the alteration. Further, paper is inexpensive, easily handled, and can be sent through the mails. Thus, the inescapable fact remains that the common document is well suited for use as an archival storage medium.

The present invention is aimed at enhancing the use of paper documents as archival storage and information carrying objects in the electronic age, and provides a printing machine for processing documents having digitized images representing information, the machine including: at least one scanning array for scanning the document and converting the document image to image signals; and means for converting the image signals to human or machine understandable information.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
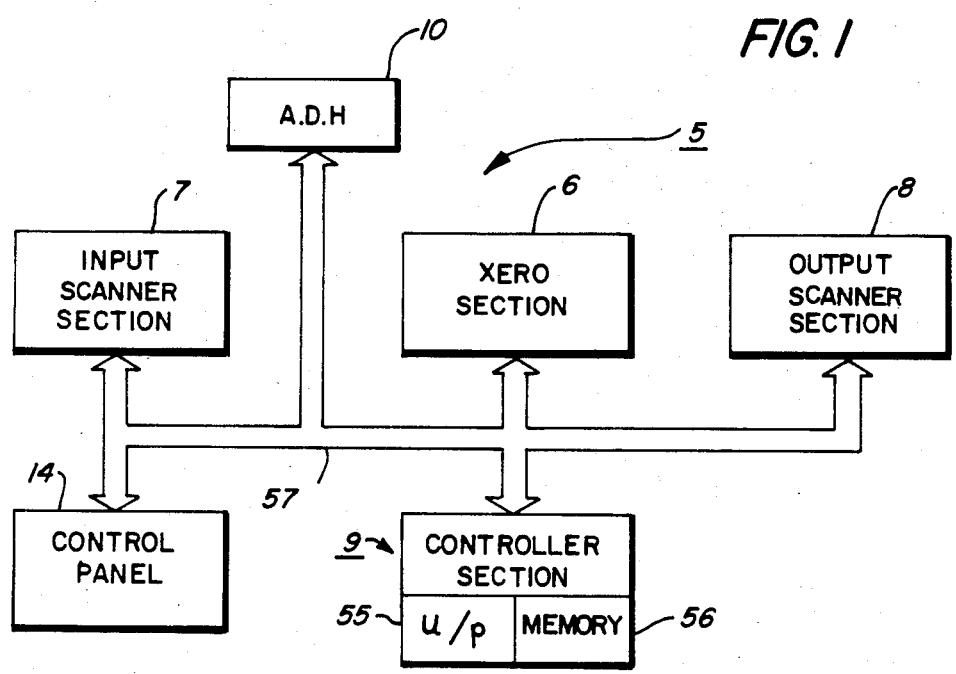
FIG. 1 is a block diagram of an electrographic printing machine of the type adapted for use with the present invention.
Figure 2:
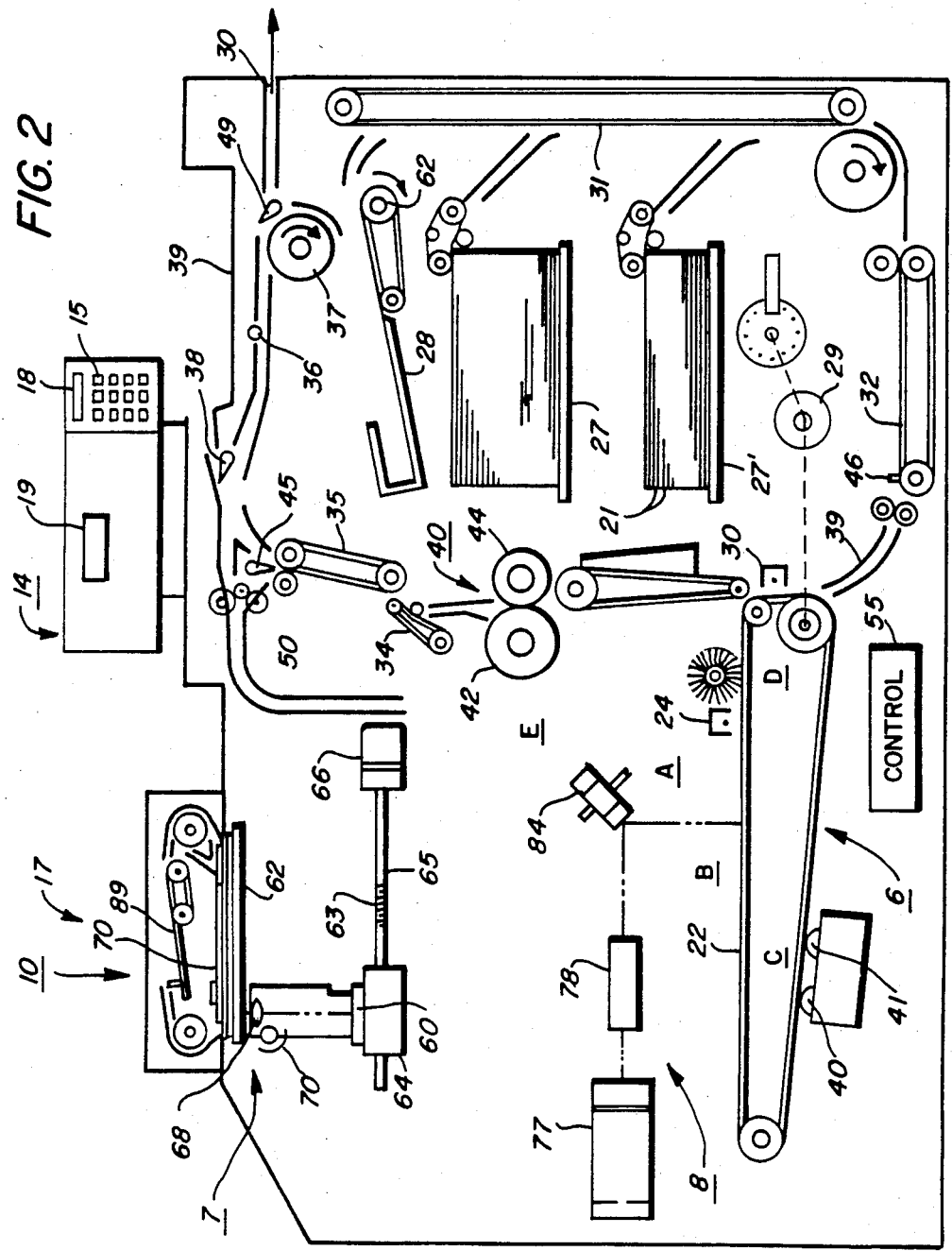
FIG. 2 is a schematized view depicting the principle component parts of the printing machine shown in FIG. 1.

For a general understanding of the features of the present invention, reference is made to the drawings. In the drawings, like reference numerals have been used throughout to designate identical elements. FIGS. 1 and 2 schematically depict the various components of an illustrative electrophotographic printing machine 5 of the type adapted to use the present invention therein. Machine 5 is a xerographic based input/output scanner having a xerographic section 6, document input scanner section 7, raster output scanner section 8, and controller section 9. Machine 5 also includes an automatic document handler 10. It will become evident from the following discussion that the invention is equally well suited for use in a wide variety of printing machines and is not necessarily limited in its application to the particular machine shown herein.

A control panel 14 allows the user or operator to select various printing functions and printing function combinations which the machine is capable of performing such as copy size, copy contrast, number of copies, the manner (duplex, for example) in which the copies are to be made, etc. Panel 14 includes programming means in the form of a numeric keyboard 15 ordinarily used by the operator for programming in the number of copies to be made. Other additional selection selectors (not shown) are provided for programming in various operating features of which machine 5 is capable, such as duplex copying, etc. One or more display panels, such as a multi-digit (i.e. eight) numeric display array 18 which displays the number programmed by keyboard 15, are provided for informing the operator of the operating status of machine 5, identifying machine faults, etc. A Start/Print button 19 is provided on control panel 14 for starting a machine print cycle.

Inasmuch as the art of electrophotographic printing is well known, the various processing stations employed in the printing machine 5 will be shown hereinafter schematically and their operation described briefly with reference thereto.

Xerographic section 6 includes a photoreceptor in the form of a belt 22 having a photoconductive surface thereon such as a selenium alloy. Belt 22 is driven by main drive motor 29 and moves in the direction of arrow 23 to advance the photoconductive surface through a charging station A where a corona generating device 24 charges the photoconductive surface of belt 22 to a relatively high substantially uniform potential. Following charging, the charged photoconductive surface is exposed at an imaging station B to create a latent electrostatic image of the copy being printed on the photoconductive surface.

A plurality of sheet transports 31, 32, 33, 34, 35, 36, and 37, which are suitably driven from main drive motor 29, cooperate with suitable sheet guides to form a paper path through which the copy sheets 21, drawn from either main or auxiliary paper supply trays 27 or 27', or from duplex paper supply tray 28, pass during processing. Finished copies are output by gate 38 to either top tray 39 or through a discharge path 30 to an external copy sheet handler such as a sorter (not shown). Suitable copy sheet sensors are provided at discrete points along the copy sheet path to provide control information and identify sheet jams.

The latent electrostatic image formed on the photoconductive surface of photoreceptor 22 is developed at a developing station C by means of a pair of magnetic brush developer rollers 40, 41 which bring a suitable developer material into contact with the electrostatic latent image. The latent image attracts toner particles from the carrier granules of the developer material to form a toner powder image on the photoconductive surface of belt 22. Thereafter, the developed image is transferred to a copy sheet 21 at transfer station D following which the copy sheet is transported to fusing station E where the developed image is permanently fixed on the copy sheet by cooperating heated fuser roller 42 and backup roller 44.

After fusing, the copy sheet may be inverted by a sheet inverter 50. An inverter selecting gate 45, when inoperative, bypasses sheet inverter 50 and sends the copy sheets to gate 38 and tray 39 or to transport 37. A deflector gate 49 routes the copies either into discharge path 30 or to duplex tray 28 which provides a buffer storage for those sheets which are also to be printed on the opposite side as well.

Input scanner section 7 employs one or more linear scanning arrays 60 which may for example comprise charge couple devices (CCD) supported below and in scanning relation to a transparent platen 62 by a carriage 64. Carriage 64 is in turn supported for reciprocating movement along a path paralleling platen 62 by rails 63. A drive screw 65 serves to move carriage 64 along rails 63, screw 65 being driven by a reversible motor 66 which selectively moves carriage 64 in either a forward or reverse scanning direction. A suitable lens 68 is provided to focus array 60 on a line-like segment of platen 62 and the document 70 resting thereon. A suitable lamp 70 illuminates the document line being scanned.

Array 60 provides electrical image signals or pixels representative of the document image scanned which, after suitable processing, are input to a suitable memory 75 (shown in FIG. 5) where the signals are stored pending use. As will be understood, the image signals may be used for purposes other than printing copies, as for example, the signals may be sent via a communication channel (not shown) to another location, or stored, etc.

Documents 70 to be scanned are brought from a document tray 88 forward by the document handler section 10 into position on platen 62 for scanning. Following scanning, the document handler returns the documents back to the document stack in the document tray 88.

While a particular document handler is shown, one skilled in the art will appreciate that other document handler types may be used instead or that the documents may be placed on the platen 62 manually.

Machine controller section 9, which controls operation of machine 5, has one or more microprocessors 55 together with suitable memory, identified generally by the number 56, for storing machine operating programs and operator instructions. The various operating components and sections of machine 5 are linked together as by means of communication channel 57.

Figure 3:
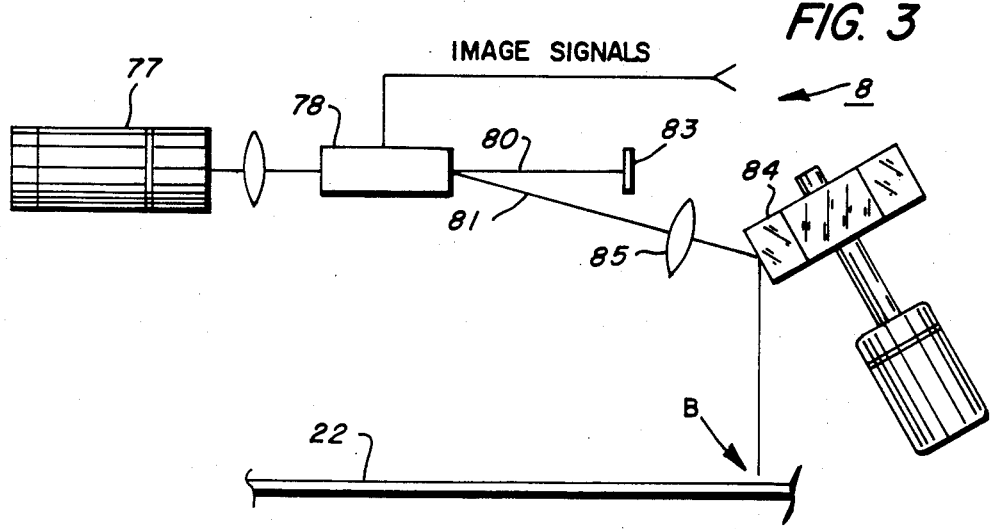
FIG. 3 is a view showing details of the machine raster output scanner section.

Referring particularly to FIG. 3, raster output scanner section 8 includes a suitable source of high intensity light such as laser 77 modulated in accordance with the content of the image signals as by an acousto-optic modulator 78 to provide zero and first order imaging beams 80, 81. Beam 80 is impinged against a beam stop 83 while beam 81 is scanned across photoreceptor 22 at exposure station B by a scanning polygon 84 to expose the previously charged photoreceptor and create a latent electrostatic image of the document represented by the image signals input to modulator 78. Suitable optical means such as lens 85 is provided to focus beam 81 on photoreceptor 22.

Documents 70, in addition to their typical use as a support for visible images such as writings graphs, pictures, etc., can be used to store or archive digitized information at moderate density and as such can serve as a relatively lower cost alternative to other forms of archival storage such as magnetic disc, tape, etc. Because of low cost, ease of production, and permanence, documents can be used for storing software such as diagnostic programs, special machine operating programs, customer training programs, accounting programs, etc., particularly in some low level applications. And where information secrecy is paramount, the document image containing the secret information could be encoded or encrypted to enable the document or document copies to be mailed or exchanged without revealing to non-authorized persons the document content.

Figure 4:
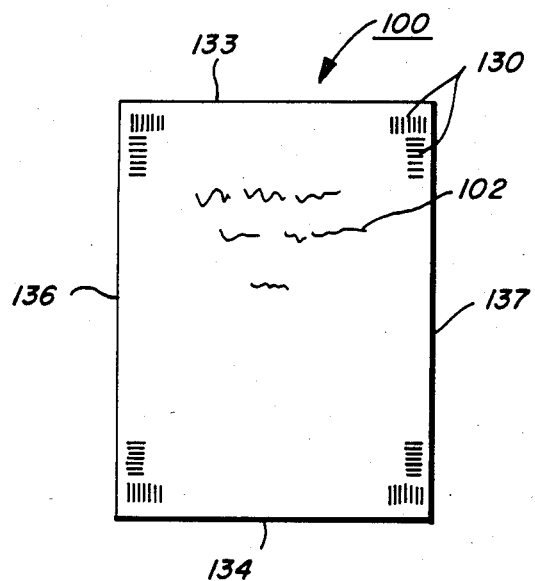
FIG. 4 is a plane view of an encoded or secret document of the present invention.

In FIG. 4, there is shown an encoded or secret document 100 in which the document image 102 has been encrypted or coded to be unrecognizable. Individuals possessing the encoded document 100 would be unable, from visually examining the document, to identify or recognize the document content. Thus, any information contained in the document image is protected against disclosure so long as the code remains unbroken. And while document 100 is capable of being copied or printed, the print or copies, unless decoded, will remain duplicates of the original encoded image so that the information represented by the image remains secret.

Figure 5:
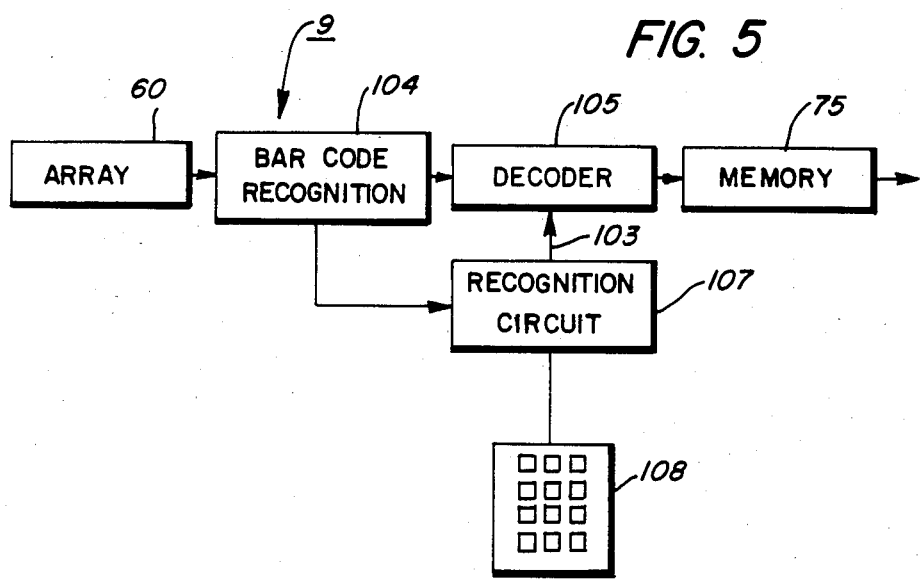
FIG. 5 is a schematic view showing details of the bar code recognition system of the present invention.

Referring to FIG. 5, to enable machine 5 to handle encoded documents 100, controller section 9 includes a suitable decoder 105. Decoder 105, when enabled, decodes the image signal output produced by array 60 when scanning the encoded document 100 to output decoded image signals representative of the hidden message on document 100 to memory 75. The decoded image signals from memory 75, when machine 5 is operated in the print cycle, are output to modulator 78 of the output scanner section 8 to print a decoded copy of the original. Where decoder 105 is not enabled, the copy produced by machine 5 duplicates the original encoded document 100 so that the message content of document 100 remains secret despite copying.

In order to control and limit decoding of document 100 to only those persons authorized to have access to the information contained therein, a suitable user or operator recognition circuit 107 is provided. Recognition circuit 107, when properly programmed by an authorized operator, outputs an enabling signal through line 103 to decoder 105, enabling operation of decoder 105.

Recognition circuit 107 may comprise any suitable identification or security circuit having suitable means for enabling a person to identify himself as one authorized to view the true image content of the encoded document 100. For this purpose, recognition circuit 107 includes a suitable input such as a keyboard 108 for enabling a person wishing to make a deciphered copy of document 100 to identify himself. Personal identification may take the form of a coded number which when properly input, causes recognition circuit 107 to enable decoder 105. Other identification forms may be envisioned and may comprise an identification system that is integral with machine 5 and which can be programmed through copier keyboard 15 or by coding blocks on a sheet in a mark-sense fashion.

Referring again to FIG. 4, in order to enable the coded document 100 to be freely intermixed with document originals 70 that are to be copied in document tray 88, an optically detectable identifying code such as bar code 130 is placed on each coded document 100.

To facilitate reading bar code 130 and assure that code 130 is not missed or mis-read, bar code 130 is preferably placed at several points on the coded document 100, i.e. along the top and bottom margins 133, 134 as well as along each side margin 136, 137, the latter assuring reading of code 130 whatever the orientation of document 100 in document tray 88 of document handler 17. And to accommodate disposition of a coded document 100 wrong side up in document tray 88, bar codes 130 are placed on both sides of the document 100. Where different image information is provided on each side of the document 100, separate identifying bar codes on the opposite sides of the document are used.

Referring to FIGS. 2 and 5, documents 100 are brought by document handler section 10 to platen 62, located thereon, and scanned in the same manner as are document originals 70. The data obtained by array 60 from scanning bar codes 130 are translated into control signals by bar code recognition circuit 104 which identify the document as a special document and output a ready signal to decoder 105.

Bar code 130 may, for example, comprise the 'matrix 2 of 5 code' and recognition system shown and described in copending application Ser. No. 931,484, filed on Nov. 17, 1986, in the names of John L. Rourke et al, incorporated by reference herein.

Figure 6:
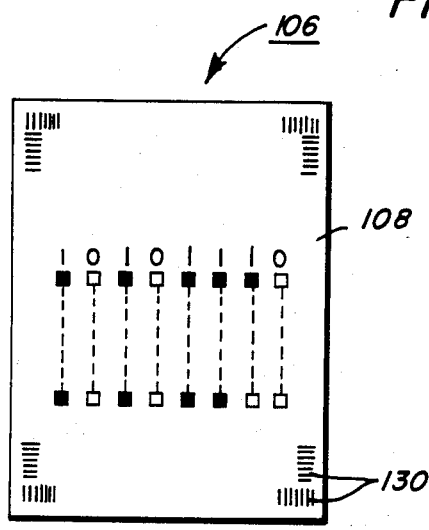
FIG. 6 is a plane view of a program document of the present invention having a machine readable software program thereon for use in inserting a special software program into the printing machine.
Figure 7:
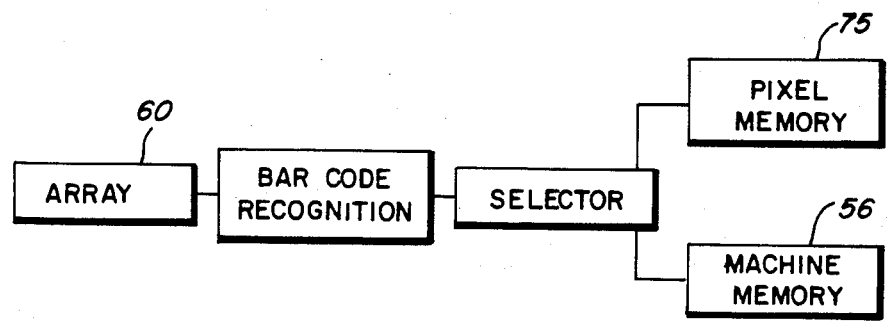
FIG. 7 is a schematic view showing details of the software reading and loading system of the present invention.

Referring now to FIGS. 1, 6 and 7, a second type of document 106 (referred to as a program document) is shown in which the document image 108 consists of a software program for operating machine 5. When scanned by scanning section 7 of machine 5, the program data is read into and stored in memory 56 of controller section 9 where it is used to operate machine 5 in a manner in which the machine could not ordinarily operate without the additional programming data.

In this embodiment, it is understood that memory 56 would be sized sufficiently large to allow additional software program(s) to be read into and at least temporarily stored in the machine memory together with provision for addressing and reading the additional program material from memory 56 when the machine function provided by the additional software is programmed by the operator. Commensurate with this, machine 5 would have built into it the necessary operating components to allow machine 5 to perform the program or programs represented by and program documents 106.

Program document 106 may have a bar codes 130 thereon in the manner described in connection with document 100. However, since document 106 would be particularly selected by the machine operator in order to load the machine with the software program desired and would necessarily require scanning first before the documents that are to be processed under the program, identifying the program documents 106 with a bar code may not be necessary or desirable, and hence may be omitted.

In addition to serving as a means to input software, program document 106 can be used to input information, which would preferably be in dense coded machine readable form, that is of particular use to a given job, such as a distribution list of names and addresses to be printed, actual mailing instructions, etc. Further, information on the program document can direct the generation of new or additional program documents such as a coded log sheet representing the work done. Other coded data which might be output would be machine diagnostic information, component part usage and longevity, etc. Other applications such as electronic compression of documents for customer storage of long documents (i.e. at 50:1 compression), etc. may be used.

The document example shown in FIG. 6 is coded in a dense digital form with each pixel element on the document (for example a black or white dot 42 microns in diameter on a 42 micron center-to-center grid) representing a binary digit. In this way, a typical 8.5 by 11 inch sheet of paper can hold 27 megabits of raw binary information per side, with one inch margins allowed on all edges. With application of well known compression algorithms to the raw data, this data density can be increased by factors of two or more. For example, compression of text to ASCII requires 8 binary bits for each character or 9 bits with error checking. Thus, a data sheet of the above described kind can contain 3.375 million characters per side. A typical typed page will contain 1000 to 2000 characters and thus compression to ASCII can be achieved in excess of 100 times so that 100 sheets can be compressed into less than a single side of a data sheet for long term archival storage or encryption or mailing. Graphics and image can be electronically compressed similarly but at lower compression ratios.

To encrypt the encoded binary data, the data stream may be multiplied by a number which acts as a password. Alternately, this password could be the base number of a pseudo-random number generator which generates a series of multipliers. Other more sophisticated password based data encryption techniques may be used to code and decode the binary data appearing on the data storage sheet.

While the invention has been described with reference to the structure disclosed, it is not confined to the details set forth, but is intended to cover such modifications or changes as may come within the scope of the following claims.

I claim:

1. In a printing machine for processing documents bearing an encoded image to provide either coded or decoded print copies, comprising:
   (a) at least one scanning array for scanning said documents and converting the document image to image signals;
   (b) a decoder effective when actuated to decode the image signals output by said array whereby said machine produces decoded prints of said documents; and
   (c) operator identifying means for actuating said decoder on input of a preset operator identification code to provide said decoded prints.

2. The machine according to claim 1 including coded indicia on said document for distinguishing documents bearing said encoded image from documents having non-encoded images.

3. The machine according to claim 2 including code recognition means for reading said image signals to identify documents having an encoded image from said coded indicia, said recognition means enabling actuation of said decoder by said operator identifying means.

4. The machine according to claim 3 in which said coded indicia is in the form of a bar code.

5. In a printing machine having a plurality of discrete operating components cooperable with one another to process both digitized and un-digitized images on documents, comprising in combination:

(a) at least one scanning array for scanning documents and converting the image on said documents to image signals;

(b) tray means for holding said documents for scanning;

(c) document transport means for bringing said documents in succession from said tray means into scanning relation with said array;

(d) control means for operating said machine, said control means including a decoder for decoding image signals representing said digitized images whereby to provide image signals representing the corresponding decoded image for printing by said machine; and (e) operator proofing means responsive to input of a prearranged code to activate said decoder and decode the image signal output of say array whereby to provide a decoded image for printing.

6. In a printing machine having a plurality of discrete operating components cooperable with one another to process image bearing documents and make prints, including in combination:

(a) at least one scanning array for scanning said documents into said machine to process and make prints, said array converting said document images to first electrical signals representative of said images;

(b) tray means for holding said documents for scanning;

(c) document transport means for bringing said document originals in succession from said tray means into scanning relation with said array;

(d) a controller for controlling said machine;

(e) memory means for storing standard software for operating said machine components in an integrated manner to process images; and (f) supplemental memory means for providing additional software for said machine, said supplemental memory means being in the form of an auxiliary document adapted for placement in said tray means so that said document transport means brings said auxiliary document into scanning relationship with said array, said additional software being in the form of coded images on said auxiliary document for scanning by said array, said array scanning said auxiliary document to input said additional software to said machine, said array converting said auxiliary document coded images to second electrical signals representative of said additional software.

7. The machine according to claim 6 in which said memory means includes a memory section for temporarily storing said additional software following scanning of said auxiliary document by said scanning array.

8. The machine according to claim 7 including decoding means for separating said second electrical signals from scanning said auxiliary document coded images from said first electrical signals from scanning said document images for input of said second electrical signals to said memory section.

9. The machine according to claim 6 in which said additional software comprises instructions for diagnosing faults in said machine.

10. The machine according to claim 6 in which said additional software comprises instructions for processing images in a new manner.

11. The machine according to claim 6 in which said additional software provides special image processing algorithms not included in said standard software.

12. The machine according to claim 6 in which said additional software provides special communication protocols not provided by said standard software.

13. In a printing machine having a plurality of discrete operating components cooperable with one another to process images, including in combination:

(a) an array for scanning documents to provide first image signals representative of the document image scanned;

(b) a controller for controlling said machine to process said first image signals and make prints of said documents;

(c) memory means for storing operating software for said machine;

(d) supplemental memory means for providing additional operating software to said machine, said supplemental memory means being in the form of an auxiliary document bearing said additional software in the form of a visible image, said array on input of said auxiliary document scanning said auxiliary document and said visible image to provide second image signals representative of said additional software for operating said machine; and (e) means for selecting either said first image image signals to process and make prints, or for selecting said second image signals to provide said additional software for operating said machine.

* * * * *